Jan. 5, 1943.　　　　　C. W. BAKER　　　　　2,307,380
REFRIGERATION
Filed Dec. 26, 1939
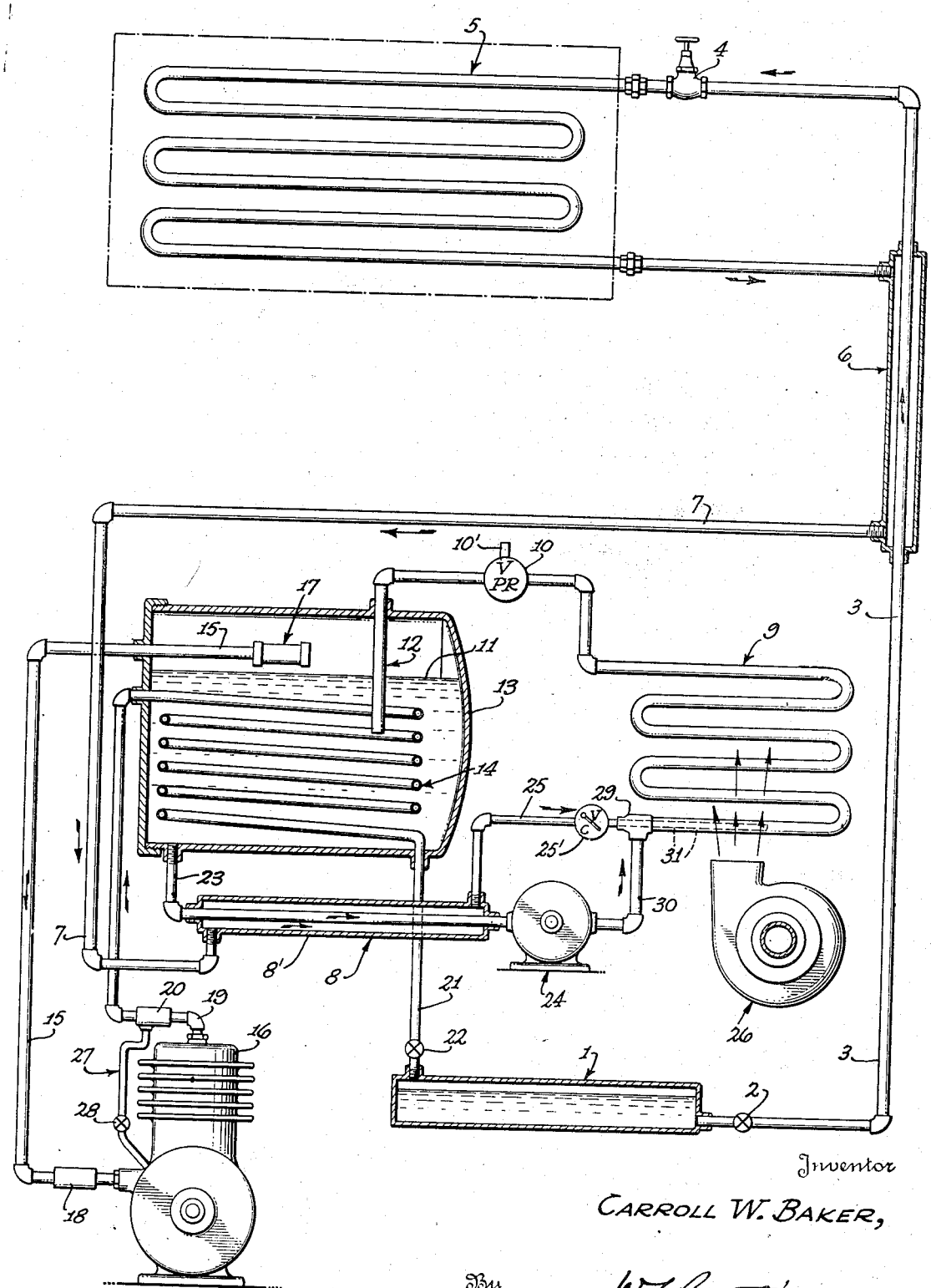
Inventor
CARROLL W. BAKER,
By W. L. Beatty
Attorney Patented Jan. 5, 1943

2,307,380

UNITED STATES PATENT OFFICE 2,307,380

REFRIGERATION

Carroll W. Baker, Los Angeles, Calif.

Application December 26, 1939, Serial No. 311,042

13 Claims. (Cl. 62—115)

The invention relates to refrigeration wherein a liquid refrigerant is vaporized to abstract heat, the vapor being thereafter compressed in a compressor and liquefied in a condenser. A certain relation exists between the pressure to which the vapor must be compressed and the cooling effect necessary for the condenser, in order that the compressed vapor may be liquefied. According to the present invention I reduce the pressure to which the vapor must be compressed, by increasing the cooling effect applied to the condenser, and preferably this is done in a complete cycle by part of the refrigerant. While other refrigerants may be used instead, I prefer to use ammonia.

The invention takes advantage of the following characteristics of aqua ammonia. A solution of aqua ammonia of a sufficient concentration to maintain an ammonia gas pressure above its surface, is to effect saturated, that is it is at its boiling point, the ammonia boiling off if the pressure is relieved or the temperature is raised. If the temperature is lowered, some of the ammonia gas will be re-absorbed again, thus lowering the vapor pressure. If the pressure is raised then the solution is not saturated and it will absorb more ammonia without additional pressure being created. Another item that must be noted is that when the pressure on a solution of ammonia is relieved and the ammonia boils off, the solution is cooled in proportion to the amount of ammonia that boils off. In fact, aqua ammonia can be used as a refrigerant by changing the pressure exerted upon it as disclosed herein. If refrigerants other than ammonia are used, liquid absorbents appropriate therefor should be used.

An object of the invention is to improve the efficiency of refrigeration. Another object is to effect localization of heat produced in the refrigerating cycle, and produce such heat at increased temperatures to facilitate its dissipation. Another object is to improve the heat exchange between a condenser and a surrounding liquid absorbent of vapor refrigerant. Another object is to prevent vapor lock of a pump employed for increasing the pressure on a liquid absorbent of vapor. Another object is to provide a refrigeration cycle supplementary to a main refrigeration cycle.

For further details of the invention, reference may be made to the drawings wherein the figure illustrates a refrigerating system and process embodying the invention.

Liquid anhydrous ammonia is stored in tank 1 and led through a service valve 2 and pipe 3 to expansion valve 4 where the liquid refrigerant vaporizes into cooling coil 5. From the cooling coil 5, the expanded vapor is led to a heat exchanger 6 which surrounds pipe 3. From the heat exchanger 6, pipe 7 carries the vapor to heat exchanger 8 which comprises pipe 8' surrounding pipe 23 from closed container 13. The vapor is led by pipe 25, having check valve 25' into heat dissipator 9 where this vapor is absorbed by a solution of aqua ammonia under pressure, led into heat dissipater 9 from tank 13 by pipe 23, and pressure pump 24 having outlet 30. From heat dissipater 9, where the vapor has been absorbed by a solution of aqua ammonia, under pressure, it is forced to back pressure valve 10, having pressure regulating stem 10', which releases it through pipe 12 at a lower pressure into an aqua ammonia solution 11 in tank or container 13. Valve 10 may also be considered as an expansion valve. Pipe 12 is submerged in the solution 11.

The heat exchange 8 cools the liquid in pipe 23 to a point where it is below saturation of ammonia and this prevents a vapor lock in pump 24.

Due to latent heat thrown off of condensing coil 14, ammonia vapor is released from aqua ammonia solution 11 in container 13. This vapor is picked up by suction pipe 15 leading to compressor 16 through a dehydrator 17 and a water trap 18.

The vapor after being compressed by compressor 16 is then forced through pipe 19 and through an oil trap 20, and it is condensed to a liquid in condenser 14 and precipitated as anhydrous liquid ammonia into liquid receiver 1 through pipe 21 and service valve 22. Pipe 23 passes inside of pipe 8' of the heat exchange 8 to pump 24. Pipe 23 draws aqua ammonia from container 13 and pump 24 forces it into heat dissipater 9 where it absorbs the vapor leaving heat exchanger 8 by pipe 25. Blower 26 is used to assist in cooling the heat dissipater 9.

Pipe 27 is an oil drain back from oil trap 20 which oil is held in check by service valve 28.

Pump 24 raises the pressure of the aqua ammonia solution a suitable amount and delivers it under pressure by way of pipe 30 to a T 29 connected to a heat dissipater 9. Pipe 25 extends through T 29 into heat dissipater 9 where it is provided with a series of perforations 31 which serve as outlets for the vapor from pipe 25 so that such gas can mix with and be absorbed by the high pressure liquid from pipe 30.

The compressed vapor in condenser 14 transfers heat to the solution 11. This heat is offset by the cooling effect produced by discharging the solution from pipe 12 at a reduced pressure, this reduced pressure resulting in ammonia gas evaporating from the solution 11 discharged by pipe 12. This evaporation of course produces a cooling effect. By thus cooling the condenser 14, it is possible to use a lower pressure on the high pressure side of compressor 16.

The pressure at which the refrigerant is discharged from pipe 12 may be varied by varying the adjustment of the stem 10' of valve 10, as will be understood. This adjustment will correspondingly vary the rate at which ammonia vapor will boil off from aqua ammonia 11 which in turn will vary the cooling effect produced on condenser 14.

The aqua ammonia in the pipe 30 is under a higher pressure than that exerted on the solution as delivered to pump 24 from the container 13 wherein an exchange of heat takes place. Therefore, the solution is not saturated in pipe 30, that is, it will absorb a great deal more ammonia. As ammonia gas is contacted at outlets 31 with the undersaturated solution from pipe 30 it becomes saturated adjacent outlets 31 and the sensible heat is raised. As the liquid and absorbed vapor passes through the tube or heat dissipater 9 there is a heat loss in the liquid due to fan 26 which permits more ammonia gas to be absorbed from the outlets 31. Again the solution becomes saturated farther along the outlets 31 and as it travels farther in the tube 9 it experiences another heat loss due to the fan 26 and becomes undersaturated again until contacted by more ammonia gas vapor from outlets 31. Therefore, as the vapor emerges from the elongated series of outlets 31 it is repeatedly or cyclically absorbed by the surrounding solution. At the end of the adsorption tube outlets 31 the liquid is saturated and the sensible heat is high. As the liquid passes on through the heat dissipater 9 losing its temperature due to fan 26, the liquid arrives at the back pressure valve 10 undersaturated at the particular pressure of dissipater 9. As the liquid passes through the expansion valve 10 and the pressure is lowered, it again becomes saturated and enters heat exchange 13 in that state.

As this absorption occurs in heat dissipater 9, the latent heat of the vapor is given off to the solution and the sensible heat of the solution is raised. This sensible heat rises considerably because of the large quantity of vapor absorbed. This localizes or concentrates the heat in a small space and therefore aids in its dissipation in heat dissipater 9. The control of the absorption of vapor in heat dissipater 9 is then obtained by changing the pressure by means of pump 24 and valve 10 rather than by changing areas. The tube 25 that enters the heat dissipater 9 is perforated with holes 31 that spreads the absorption through an extended portion of the tube comprising the dissipater 9. The blower 26 then cools the liquid. As the liquid passes through the back pressure valve 10 and the pressure is lowered, the liquid 11 is cooled by the boiling off of the ammonia. The liquid goes back to the heat exchange 13 through pipe 12 under a reduced pressure, which is higher than that of the heat exchanger 13. By doing this, the condensing pressures in coil 14 can be lowered a great deal, as above explained. The lower condensing pressures likewise lower the mean effective pressures of the compressor 16 and thus less power is consumed in condensing in coil 14. The quantity of solution passed through the dissipater 9 is very small and requires a very little power. The power saved by this arrangement reduces operating cost materially.

Another advantage of the present invention is as follows: When a shock load, such as opening the door of a refrigerator, comes on a coil such as 5 with a conventional refrigeration system, the reserve liquid in the coil evaporates faster than the compressor can take care of it, thereby raising the gas pressure and closing the automatic expansion valve such as 4 thus restricting the passage of additional liquid refrigerant into the coil such as 5 and consequently reducing the capacity of the machine until the compressor has been able to remove the additional gas from coil such as 5. In the present system however, the extra gas formed due to the shock load on coil 5 and the boiling of the reserve refrigerant in that coil is absorbed by the solution in container 13, thus causing vapor pressure in container 13 to rise very slowly and thus eliminating the closing of the automatic expansion valve 4, whereby refrigeration is maintained in coil 5, in spite of the shock load.

The action of the heat exchange 13 is as follows: the hot vapor is under pressure in the condenser 14 and gives up its latent heat to the solution 11. The solution 11 then is cooled by the heat pickup of the ammonia vapor leaving the solution 11. There is a slight heat loss from the exchange 13 because of water vapor. The heat exchange between the ammonia vapor in the condenser 14 and the boiling off of the ammonia from the aqua ammonia 11 is an even heat exchange if the vapor pressure remains the same.

The dehydrator 17 can be built so that a heat exchange from the returning evaporating coils 14 will condense most of the water vapor that passes off with the ammonia gases as they are picked up and led back to the suction side 15 of the compressor 16.

The heat exchange 8 lowers the temperature of the solution in pipe 23 before it is placed under pressure by pump 24, thus aiding in rapid absorption in the heat dissipater 9.

The lower condensing temperatures and pressures also aid in keeping the flash to a minimum thus giving a greater efficiency with regard to quantity of heat pickup compared with quantity of ammonia which passes through the system.

Heretofore it has been proposed to absorb and liberate ammonia gas into an already saturated solution of aqua ammonia which means that that solution will not accept any more ammonia until cooled or the vapor pressure increased. The result of this is that a great deal of the ammonia gas is not absorbed but raises to the surface and is picked up by the compressor and when returned to the condensing coils does not have an even heat exchange between the amount of vapor condensed and the amount of vapor liberated from the solution.

According to the present invention, the aqua ammonia is taken from tank 13 at a given pressure and raised to a given pressure by pump 24. The aqua ammonia solution 11 is not saturated in tank 13; i. e., it is slightly undersaturated. Now as the ammonia gas enters the undersaturated solution of aqua ammonia at 29, the ammonia gas is immediately absorbed and gives off its latent heat, which heat is dissipated by fan 26 as the absorption continues for a considerable length of the dissipater coil 9. Such dissipation of the heat continually increases the absorbing ability of the aqua ammonia in coil 9. As the water of solution 11 is a means of picking up the latent heat given off from the condensing coils 14, I have present in this solution 11 of aqua ammonia, the same amount of ammonia absorbed as the amount of vapor ammonia condensed in coils 14. But if solution 11 is saturated as previously proposed, a great deal of vapor bubbles up through the solution and is picked up by the compressor without going through the heat exchange of the solution. By this differential of pressure in the present invention, and dissipating heat by fan 26 as it is picked up by the absorption of the ammonia gas in the solution at coil 9, I actually have an undersaturated solution where all of the ammonia is absorbed.

In the present system then, the water in the heat exchange 13 is slightly undersaturated due to the compressor pulling the ammonia gas off; also the only ammonia vapor given off from the solution of aqua ammonia is that vapor which is picking up the latent heat from the condensing coils 14.

I claim:

1. The process of refrigeration which comprises mixing the vapor from liquid anhydrous ammonia with aqua ammonia solution under pressure, relieving said pressure, dehydrating and compressing ammonia vapor from said solution of relieved pressure to form liquid anhydrous ammonia, and vaporizing said liquid anhydrous ammonia to effect refrigeration and form said first mentioned vapor.

2. A refrigerating system comprising the combination of means supplying a liquid refrigerant, means for compressing and means for condensing vapor from said liquid, means supplying a liquid absorbent of vapor from said liquid refrigerant, means for increasing the pressure of a portion of said absorbent liquid, means for mixing vapor of said liquid refrigerant with said absorbent liquid of increased pressure, and means for expanding said absorbent liquid of increased pressure in heat exchange relation to said condensing means.

3. A refrigerating system comprising the combination of an expansion valve, a compressor connected thereto, a tank, a liquid absorbent of vapor in said tank, a condenser in circuit with said compressor in said tank, a pressure pump having an inlet and an outlet in circuit with said tank, means for supplying vapor from said expansion valve to the high pressure side of said pump, a pressure reducing valve in said outlet, means for supplying vapor from said tank to said compressor, and means for supplying liquid refrigerant from said condenser to said expansion valve.

4. A refrigerating system comprising the combination of a pressure pump, a tank for a liquid absorbent of vapor, said pump having an inlet connected to said tank and an outlet, a heat dissipater, means for mixing vapor of a liquid refrigerant with absorbent liquid from said outlet in said heat dissipater, cooling means for said heat dissipater, a supply pipe from said heat dissipater to said tank, a pressure reducing valve in said supply pipe, and a vapor outlet for said tank.

5. The process of refrigeration which comprises storing a liquid refrigerant, storing a liquid absorbent of vapor from said liquid refrigerant, increasing the pressure of said liquid absorbent, mixing vapor from said liquid refrigerant with said liquid absorbent whereby the latent heat of absorption is localized to create a high temperature differential, and dissipating the heat thus created.

6. The process of improving the heat exchange between a condenser and a surrounding body of liquid absorbent of vapor to be condensed, which comprises removing from said body the vapor due to heat exchange between said body and said condenser, and removing some of said liquid and replacing the same oversaturated and charged with said vapor at a pressure differential with respect to said body.

7. The method of increasing saturation of a liquid vapor absorbent with a vapor refrigerant therein which comprises mixing said vapor with said liquid in a coil, dissipating the heat of said coil due to the resulting absorption of said vapor in said liquid to reduce saturation, and repeatedly absorbing additional amounts of said vapor in said liquid of reduced saturation in said coil.

8. The method of refrigeration which comprises supplying a liquid refrigerant adapted to vaporize for refrigeration, supplying a solution of said vapor, supplying vapor from said liquid refrigerant to said solution, compressing and condensing vapor of said liquid refrigerant from said solution, supplying heat needed to drive said vapor out of said solution by arranging said condensing in heat exchange relation to said solution, and replenishing the supply of said liquid refrigerant from the vapor thus condensed.

9. A refrigerating system comprising means for supplying a vaporizable liquid refrigerant, means for supplying a solution of vapor from said liquid, means for supplying said vapor after refrigeration to said solution, means for compressing and means for condensing vapor of said liquid from said solution, a connection from said condensing means to said first mentioned means, and a heat exchanger comprising said condensing means and said solution.

10. A refrigerator system comprising the combination of a tank for a vaporizable liquid refrigerant, a refrigerator coil connected to said tank, a heat exchanger comprising a tank of a solution of said vapor, means for delivering vapor from said coil to said solution, a compressor, means for delivering vapor of said liquid from said solution to said compressor, a condenser for said compressor in the solution in said heat exchanger, and means for delivering condensed vapor from said condenser to said first tank.

11. The method according to claim 8 which comprises the additional step of cooling said solution by an amount to substantially offset its increase in sensible heat due to absorbing said vapor.

12. A refrigerating system according to claim 9 comprising means for cooling said solution by an amount to substantially offset its increase in sensible heat due to supplying said vapor to said solution.

13. A refrigerating system according to claim 10 comprising a second heat exchanger for cooling said solution.

CARROLL W. BAKER.